Patented Jan. 29, 1929.

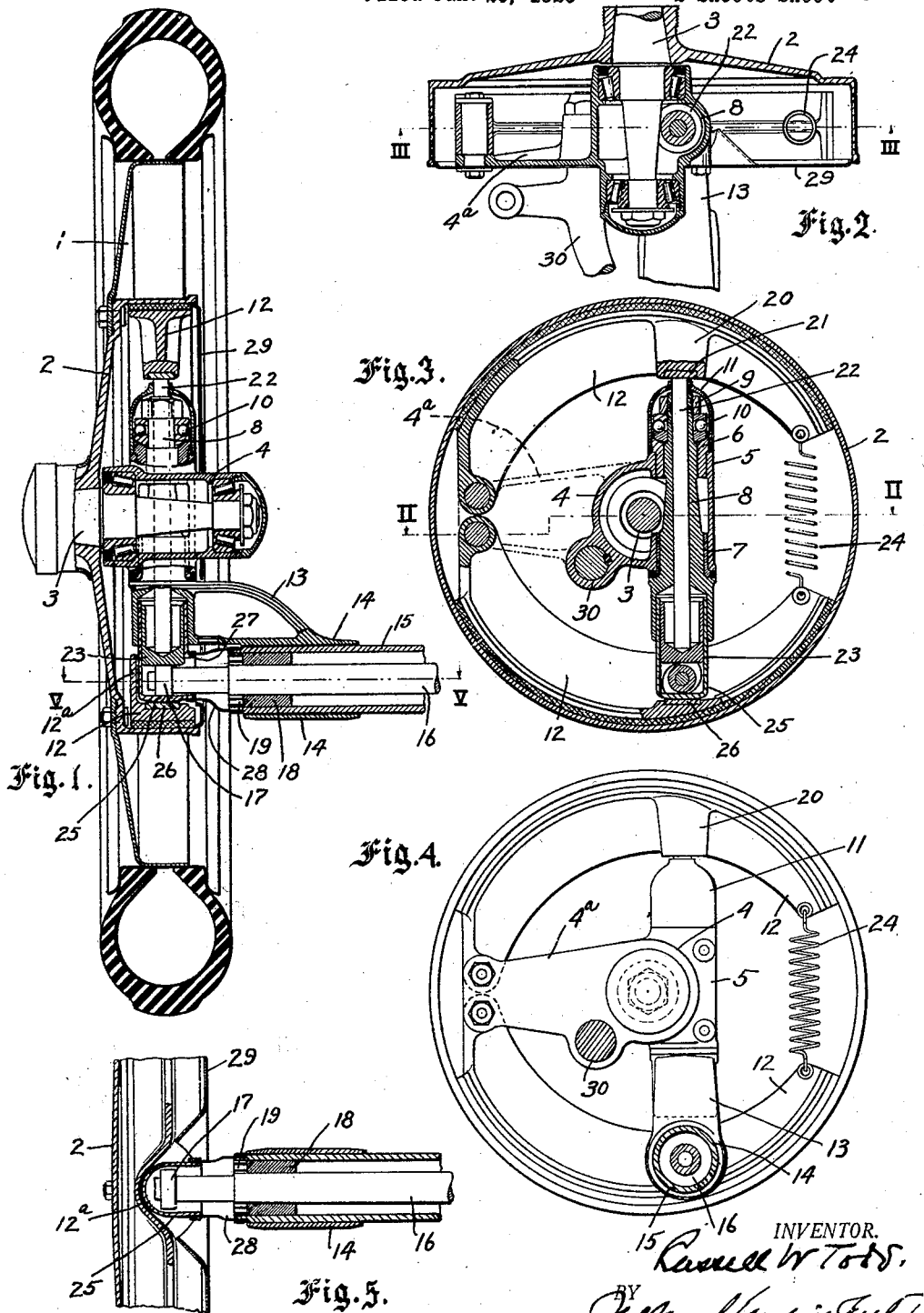

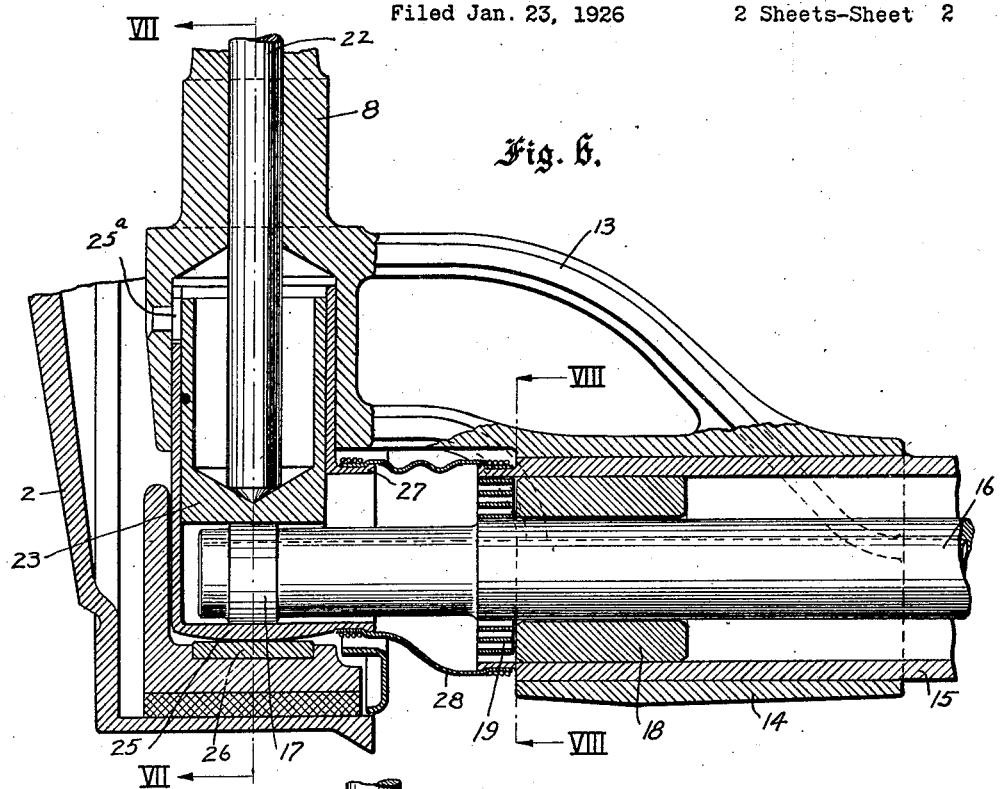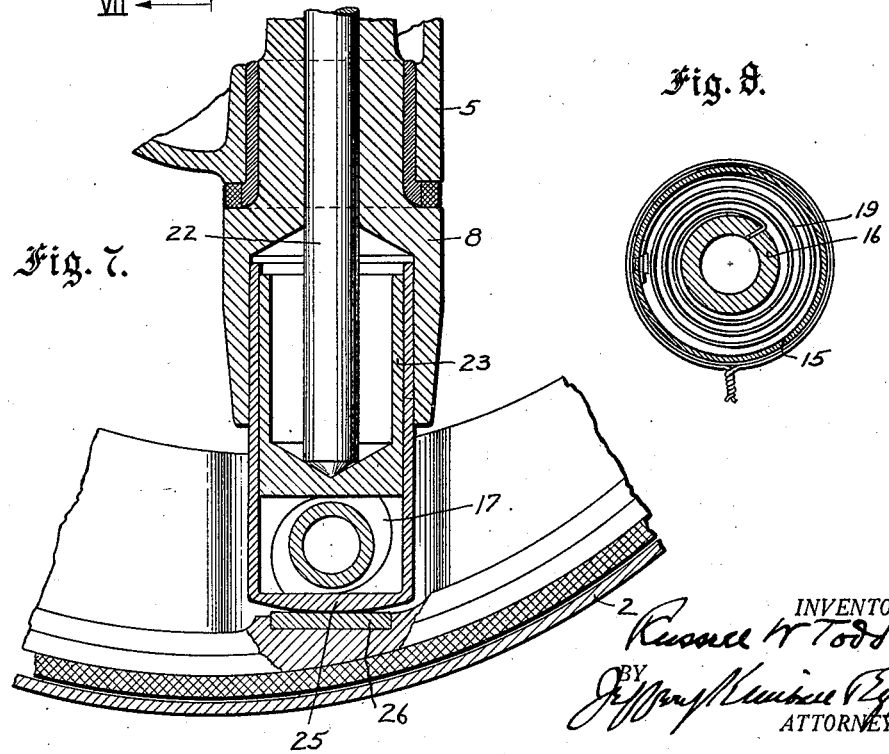

1,700,575

UNITED STATES PATENT OFFICE.

RUSSELL W. TODD, OF BRONXVILLE, NEW YORK.

STEERING-WHEEL BRAKE.

Application filed January 23, 1926. Serial No. 83,225.

The invention relates to brakes for automobiles and has for its object the provision of a simplified and improved brake, particularly applicable to the front or steering wheels. The invention accordingly consists in the arrangement and combinations of parts hereinafter described and particularly pointed out in the claims appended hereto.

In the drawings,

Fig. 1 is a central vertical section through one of the steering wheels of an automobile showing the invention applied thereto.

Fig. 2 is a sectional view on the line II—II of Fig. 3 through the wheel hub and brake drum.

Fig. 3 is a vertical section on the line III—III of Fig. 2.

Fig. 4 is an elevation illustrating the inner side of the brake drum and steering knuckle.

Fig. 5 is a sectional plan view on the line V—V of Fig. 1.

Fig. 6 is a sectional view on an enlarged scale of the lower portion of the brake drum showing the common operating means for both brake shoes.

Fig. 7 is a view looking in the direction of the arrows and along the line VII—VII of Fig. 6.

Fig. 8 is a detail view on the line VIII—VIII of Fig. 6 showing the spring return for the cam shaft.

The invention is herein shown as applied to an automobile wheel of the disc type, the particular advantage resulting from this arrangement being that the complete brake unit, including the drum, shoes and operating mechanism can be readily and inexpensively mounted in the central plane of the wheel, it being understood, however, that the invention is not limited to this particular type of wheel but may be applied equally well to wheels of other types.

As shown, the disc 1 is suitably secured as by nuts and bolts to the periphery of a brake drum 2, the hub of which is bored to fit the outer cone of the wheel arbor 3. This arbor cooperates with a roller bearing hub of the conventional type, the whole being enclosed and supported by a casing 4, which is pivotally connected to the front axle as follows: Integral with the hub casing 4, there is provided a vertical cylindrical extension 5 constituting the steering knuckle proper. Within the knuckle and spaced therefrom by bearing sleeves 6 and 7 is the pivot post 8. This post is rigid on the front axle and its upper end is threaded to receive a clamping nut 9 for the upper race of the main knuckle bearing 10. Enclosing this bearing and at the upper end of the pivot post is a cap 11 internally threaded at its lower end and thereby secured to the upper end of the sleeve 6. The post 8, is an integral part of the knuckle yoke which yoke comprises the pivot post 8, a supporting arm 13 and a sleeve 14 by means of which the yoke is secured to the axle 15.

As shown, the axle 15 is tubular and encloses a shaft 16 on the outer end of which is a brake shoe expander cam 17, a bushing 18 being provided adjacent the outer end of the axle 15 to support the brake shaft 16 together with a coil spring 19 (as shown in detail in Fig. 8), which assists in returning the brake shaft to its inoperative position.

Referring now specifically to the brake shoe operating means, it will be seen that the shoes 12 themselves are pivoted to a lateral extension of the knuckle or hub casing 4 thus operating in a vertical instead of horizontal direction and that the upper shoe is provided with a downwardly extending lug 20, the lower end of which is provided with a hardened bearing disc 21 against which abuts the upper end of a thrust member 22. The thrust member 22 is a rod sliding within the pivot post 8 and at its lower end engages a cam follower 23 which bears against the top of the cam 17, contact between the two being maintained by the usual collapsing spring 24 connecting the free ends of the brake shoes.

The cam follower 23 telescopes into a cup 25 and the latter telescopes into the recess or chamber in the bottom of post 8. The cam 17 is interposed between the follower and the bottom of the cup so that when the cam is rotated the cup and follower are separated or extended. The lower end of the cup thrusts against a hardened bearing disc 26 carried by the lower brake shoe. The cup is secured against rotation relatively to the post 8, as by means of the riveted key 25$^a$ and the slot, which construction however permits of relative longitudinal movement between the cup and post.

As was mentioned above in connection with the upper brake shoe, the bearing disc 26 and the cup 25 are retained in engagement with the cam 17 by the spring 24. The cup 25 is provided with a lateral neck opening 27 shaped to form a suitable connection for a boot 28 extending to the end of the axle for excluding dust and dirt at this point. As a further precaution against the entry of foreign substances into the interior of the brake drum a cover plate 29 is removably fitted to the structure 12 so as to enclose the interior of the brake drum. It will be noted that the lower brake shoe flange is offset adjacent the cup 25 to provide clearance from the latter, as shown at 12ª in Figs. 1 and 5. By this means the strength of the shoe is not impaired.

From the foregoing it will be apparent that the wheel is free to rotate on its bearings within the hub casing 4 and when subjected to the action of the drag-link through the steering arm 30 that it is free to turn about the pivot post 8. Furthermore the rotation of the cam shaft 16 will result in a simultaneous operation or separation of both brake shoes, the lower directly through the bottom of the cup 25 and the upper through the intermediary of the thrust rod 22. It will be understood however that the particular illustrated embodiment of the invention herein described and illustrated can be varied considerably without departing from the scope of the following claims.

I claim—

1. In combination with a wheel, a brake drum secured to the wheel and mounted substantially in the central plane thereof, a pair of brake shoes, a steering knuckle for the wheel, a pivot post within the knuckle and offset in relation to the wheel axis and a brake shoe operating member within the pivot post.

2. Automobile steering and braking mechanism comprising in combination with a steering wheel, a brake drum substantially within the plane of the wheel rim, brake shoes respectively in upper and lower positions within the drum, a steering knuckle and pivot post within the drum, a tubular load supporting axle and eccentric means in line with the pivot post and in line with said axle for expanding the brake shoes.

3. Automobile steering and braking mechanism comprising in combination with a steering wheel, a brake drum substantially within the plane of the wheel rim, a pivot post and steering knuckle within the drum, brake shoes pivoted on a horizontal extension of the steering knuckle and adapted to operate in a vertical direction within the drum and means located in the lower part of said drum for expanding the said shoes.

4. Automobile steering and braking mechanism including in combination with a load supporting axle, a steering wheel pivot post rigidly supported thereby, a brake thrust member within the post, a steering knuckle journalled on said post, a wheel hub casing rigidly secured to the knuckle and a wheel carrying hub journalled in said casing.

5. A steering wheel brake assembly including in combination with a load supporting axle, a tubular pivot post rigidly supported thereby, a steering knuckle journalled on said post intermediate its length and a brake operating thrust member enclosed by the pivot post.

6. In combination with a wheel, a brake drum secured to the wheel and mounted substantially in the central plane thereof, a hub extending inwardly of the wheel face and substantially within the confines of the brake drum, brake shoes, a pivot post and brake shoe operating member extending across the drum and arranged concentrically with respect to each other and a steering knuckle mounted on said post.

7. In combination with a wheel, a brake drum, a pair of brake shoes therein, a rod member and a cup member telescoping one within the other and each engaging one of said shoes, a brake shaft and a cam thereon mounted within the cup and engaging both cup and rod for distending the same.

8. In combination with a wheel, a brake drum secured thereto, a pair of brake shoes, an expanding shoe-operating member extending across the drum, offset in relation to the wheel axis, and a wheel hub extending inwardly of the drum and pivoted for steering movement about the axis of said member.

9. In a steering wheel braking mechanism the combination of a wheel and hub, a brake drum mounted outside of and substantially enclosing the wheel hub, a pair of brake shoes, a steering knuckle located within the drum and having its axis offset in relation to the hub, and shoe operating means mounted within the drum and in line with the knuckle axis.

In testimony whereof, I have signed this specification.

RUSSELL W. TODD.